US008308271B2

(12) United States Patent
Seki et al.

(10) Patent No.: US 8,308,271 B2
(45) Date of Patent: Nov. 13, 2012

(54) 3D INKJET PRINTER

(75) Inventors: Kazutomo Seki, Tomi (JP); Yoshiki Onozawa, Tomi (JP); So Inukai, Tomi (JP); Nobuyuki Ono, Tomi (JP)

(73) Assignee: Mimaki Engineering Co., Ltd., Tomi-Shi (JP)

( * ) Notice: Subject to any disclaimer, the term of this patent is extended or adjusted under 35 U.S.C. 154(b) by 125 days.

(21) Appl. No.: 12/948,787

(22) Filed: Nov. 18, 2010

(65) Prior Publication Data

US 2011/0115849 A1    May 19, 2011

Related U.S. Application Data

(63) Continuation of application No. PCT/JP2008/072551, filed on Dec. 11, 2008.

(51) Int. Cl.
*B41J 23/00* (2006.01)
*B29C 67/00* (2006.01)

(52) U.S. Cl. ............................................. 347/37; 347/38
(58) Field of Classification Search ...................... 347/37
See application file for complete search history.

(56) References Cited

U.S. PATENT DOCUMENTS

| 3,757,638 | A | * | 9/1973 | Martin | 409/335 |
| 5,225,650 | A | * | 7/1993 | Babel et al. | 219/121.69 |
| 5,239,160 | A | * | 8/1993 | Sakura et al. | 219/121.82 |
| 7,185,412 | B2 | * | 3/2007 | Penick et al. | 29/560 |
| 2007/0231434 | A1 | * | 10/2007 | Ream et al. | 426/383 |

FOREIGN PATENT DOCUMENTS

| JP | 62-111749 | 5/1987 |
| JP | 2000-219304 | 8/2000 |
| JP | 2008-114493 | 5/2008 |
| JP | 2008-221496 | 9/2008 |

OTHER PUBLICATIONS

International Search Report for International Application No. PCT/JP2008/072551, Feb. 17, 2009.

* cited by examiner

*Primary Examiner* — Matthew Luu
*Assistant Examiner* — Alexander D Shenderov
(74) *Attorney, Agent, or Firm* — Ditthavong Mori & Steiner, P.C.

(57) ABSTRACT

A 3D inkjet printer includes an inkjet head and a medium holder configured to hold a medium having a three-dimensional shape. A Y-axial driving mechanism is capable of moving the inkjet head along a Y-axial. A Z-axial supporting mechanism supports the medium holder so as to be movable along a Z-axial direction. An X-axial driving mechanism is capable of moving the Z-axial supporting mechanism along an X-axial direction. A Z-axial driving mechanism is capable of moving the medium holder along the Z-axial direction. The medium holder includes an A-axial driving mechanism capable of swinging the medium along an A-axial direction. The A-axial direction is a rotational direction about a shaft disposed along the Y-axial direction. A B-axial driving mechanism is capable of rotating the medium along a B-axial direction. The B-axial direction is a rotational direction about a shaft disposed perpendicular to the Y-axial direction.

7 Claims, 3 Drawing Sheets

3D INKJET PRINTER

CROSS-REFERENCE TO RELATED APPLICATIONS

The present application is a continuation application of International Application No. PCT/JP2008/072551, filed Dec. 11, 2008. The contents of this application are incorporated herein by reference in their entirety.

BACKGROUND OF THE INVENTION

1. Field of the Invention

The present invention relates to a 3D inkjet printer.

2. Discussion of the Background

A typical inkjet printer performs printing on a surface of a flat medium is carried on a platen by discharging ink on the surface of the medium from an inkjet head.

In response to a demand in recent years for printing on a medium of a three-dimensional shape, a 3D inkjet printer has been proposed in Japanese Patent Application Laid-open No. S62-111749. The 3D inkjet printer disclosed in Japanese Patent Application Laid-open No. S62-111749 discharges ink on the surface of the medium from an inkjet head while moving up and down a medium holder that holds the medium of a three-dimensional shape and at the same time moving the medium holder and the inkjet head relative to each other in a 3D space.

However, in the 3D inkjet printer disclosed in Japanese Patent Application Laid-open No. S62-111749, a high quality image cannot be printed because a positional relation between the inkjet head and the medium varies according to a printing position.

SUMMARY OF THE INVENTION

According to one aspect of the present invention, a 3D inkjet printer includes a medium holder, an inkjet head, a Y-axial driving mechanism, a Z-axial supporting mechanism, an X-axial driving mechanism, and a Z-axial driving mechanism. The medium holder is configured to hold a medium having a three-dimensional shape with a surface to be printed. The inkjet head is configured to discharge ink to print on the surface of the medium while the medium holder and the inkjet head relatively move. The Y-axial driving mechanism is capable of moving the inkjet head along a Y-axial direction. The Y-axial direction is a main scanning direction. The Z-axial supporting mechanism supports the medium holder so as to be movable along a Z-axial direction. The Z-axial direction is a hoisting direction perpendicular to the Y-axial direction. The X-axial driving mechanism is capable of moving the Z-axial supporting mechanism along an X-axial direction perpendicular to the Y-axial direction and the Z-axial direction. The Z-axial driving mechanism is capable of moving the medium holder along the Z-axial direction. The medium holder includes an A-axial driving mechanism and a B-axial driving mechanism. The A-axial driving mechanism is capable of swinging the medium along an A-axial direction. The A-axial direction is a rotational direction about a shaft disposed along the Y-axial direction. The B-axial driving mechanism is capable of rotating the medium along a B-axial direction. The B-axial direction is a rotational direction about a shaft disposed perpendicular to the Y-axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
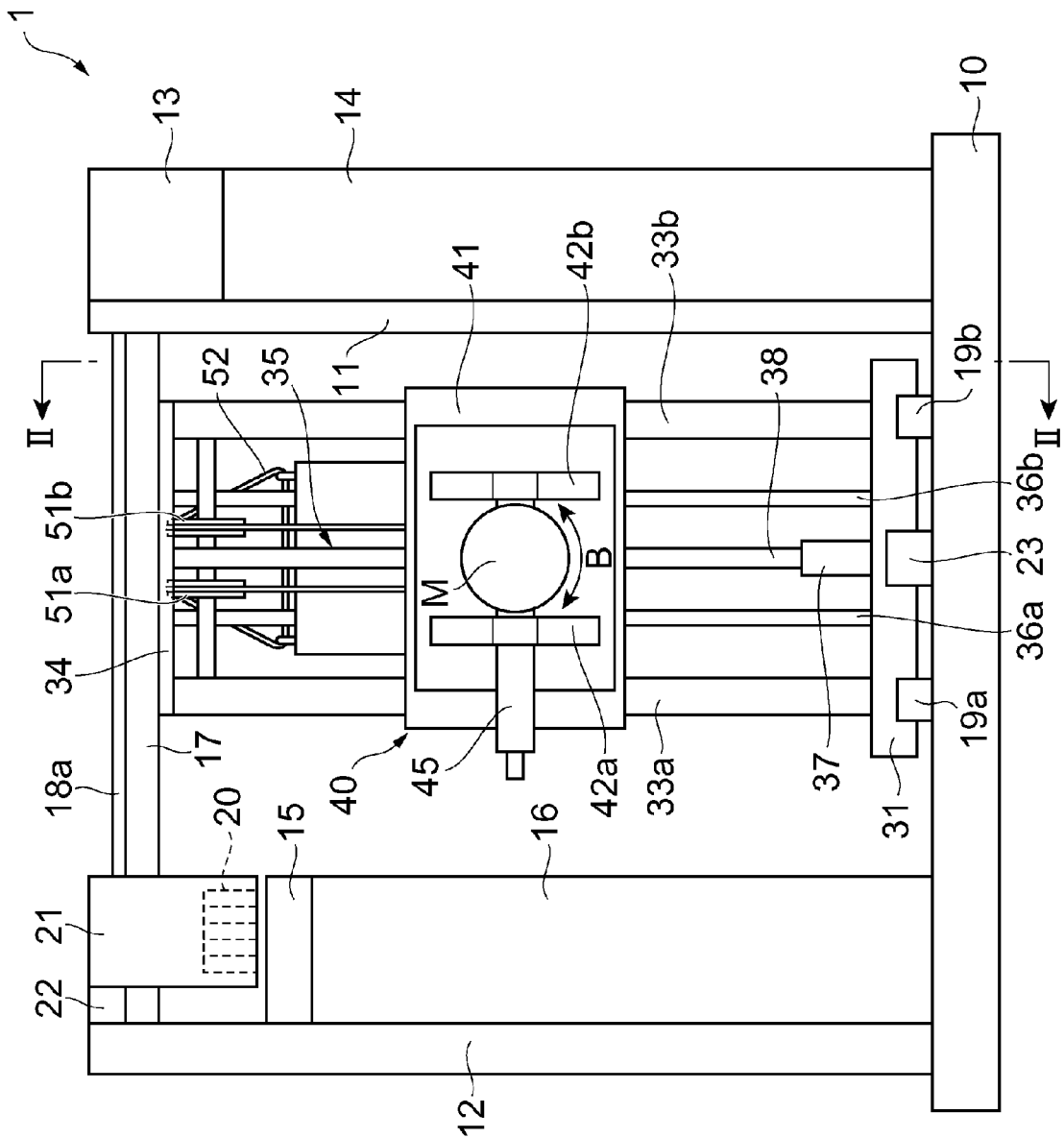
FIG. 1 is a front view of a 3D inkjet printer according to an embodiment of the present invention.

Exemplary embodiments of the present invention are explained below with reference to the accompanying drawings. The same reference numerals are assigned to the parts in different figures if those parts are identical or are equivalent.

Figure 2:
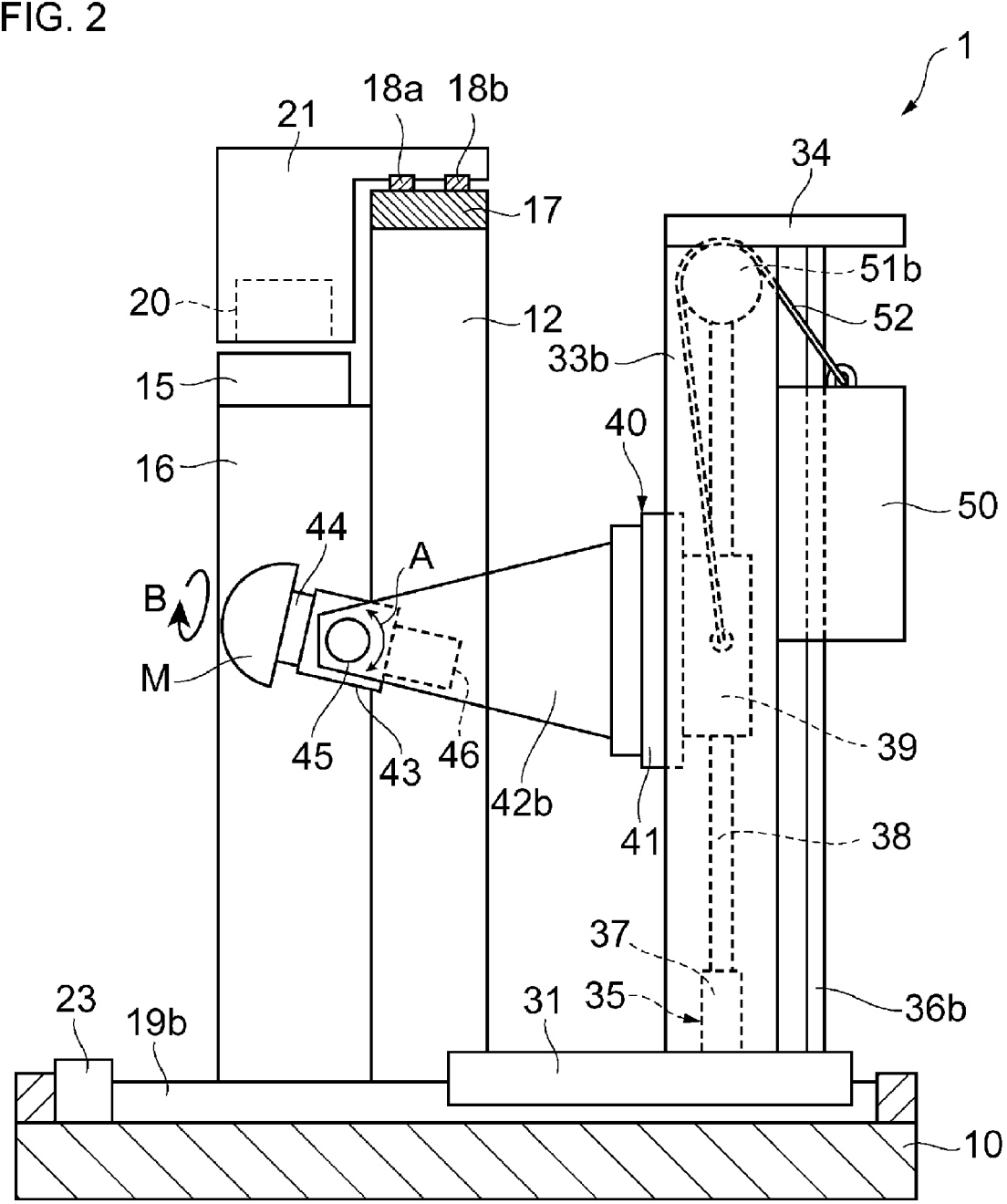
FIG. 2 is a sectional view of the 3D inkjet printer shown in FIG. 1 along arrows II-II.
Figure 3:
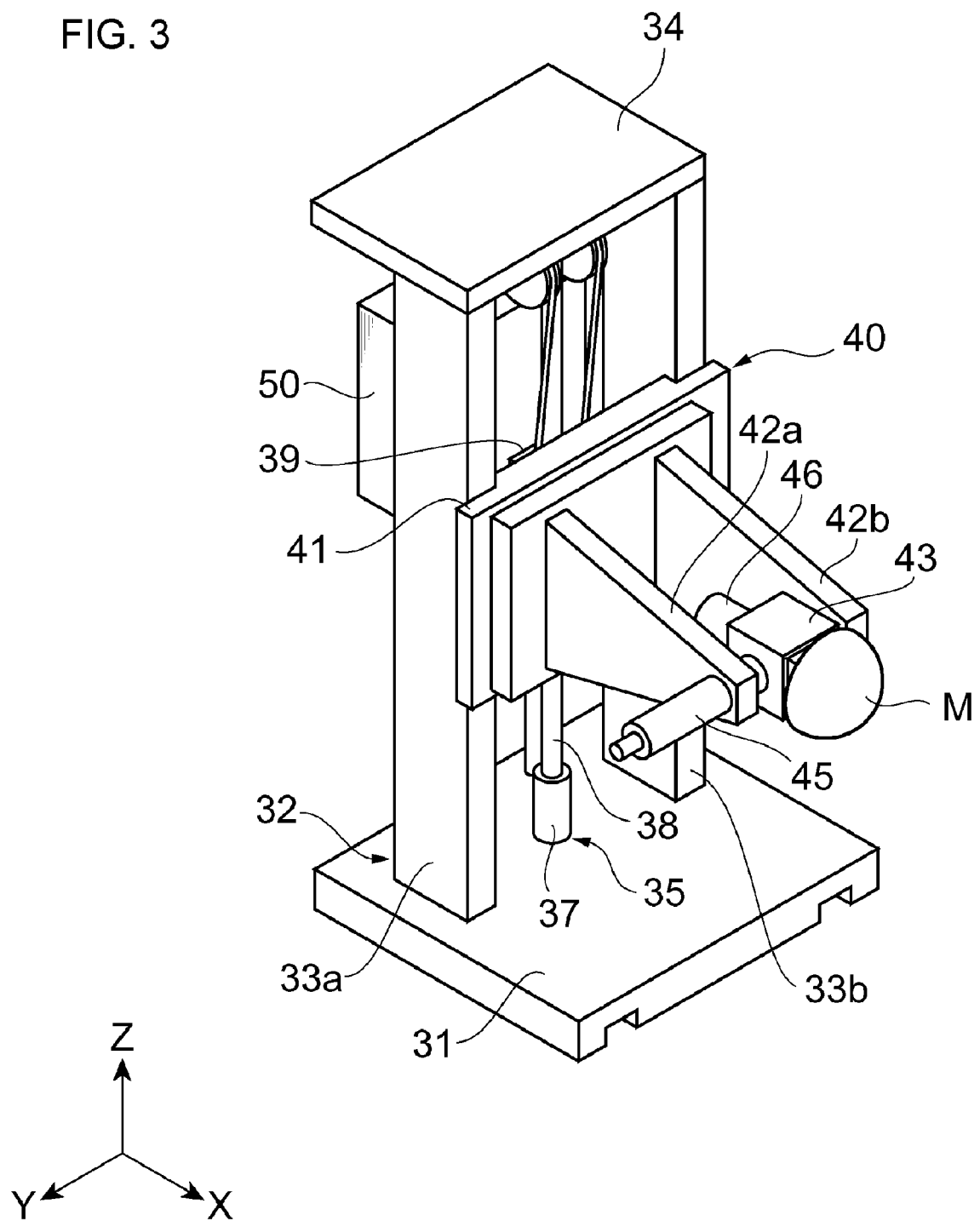
FIG. 3 is a partial perspective view of the 3D inkjet printer shown in FIG. 1.

FIG. 1 is a front view of a 3D inkjet printer according to an embodiment of the present invention. FIG. 2 is a sectional view of the 3D inkjet printer shown in FIG. 1 along arrows II-II. FIG. 3 is a partial perspective view of the 3D inkjet printer shown in FIG. 1. In the present embodiment, a horizontal direction in FIG. 1 (anteroposterior direction in FIG. 2) is assumed to be a Y-axial direction, an anteroposterior direction in FIG. 1 (horizontal direction in FIG. 2) is assumed to be an X-axial direction, and a vertical direction in FIG. 1 (vertical direction in FIG. 2) is assumed to be a Z-axial direction.

As shown in FIGS. 1 and 2, a 3D inkjet printer 1 according to the present embodiment prints on a surface of a medium M of a three-dimensional shape by moving an inkjet head 20 that discharges ink and a medium holder 40 that holds the medium M relative to each other, and discharging the ink from the inkjet head 20.

The 3D inkjet printer 1 includes a pair of supporting legs 11 and 12 attached to a base 10, and are arranged on the left and right along the Y-axial direction. A first control device 14, which carries a control panel 13 used for receiving instructions from an operator, is fixed to the supporting leg 11 located on the right along the Y-axial direction. A second control device 16, which carries a maintenance station 15 for cleaning the inkjet head 20, is fixed to the supporting leg 12 located on the left along the Y-axial direction. The first control device 14 and the second control device 16 are control devices that exert control over a relative movement between the medium holder 40 and the inkjet head 20, discharge of the ink from the inkjet head 20, and the like, described in detail later. Although in the present embodiment the first control device 14 and the second control device 16 are separate entities, a single entity can serve as both, physically and functionally. Alternatively, the first control device 14 and the second control device 16 can be divided into a plurality of entities.

A supporting beam 17 extends along the Y-axial direction between the supporting legs 11 and 12. A pair of Y-axial guide rails 18a and 18b that is arranged in parallel along the X-axial direction extend above the supporting beam 17 along an extension direction of the supporting beam 17. A head carriage 21, which carries the inkjet head 20, is mounted on the Y-axial guide rails 18a and 18b in such a way as to be movable along the Y-axial direction.

The inkjet head 20 discharges ink of a plurality of colors, and prints a color image on the medium M held by the medium holder 40. A plurality of nozzles is arranged in the inkjet head 20 to discharge inks of various colors, such as yellow, magenta, cyan, and black. The inkjet head 20 is arranged at the bottom edge of the head carriage 21 so as to face the medium M held by the medium holder 40.

The head carriage 21 is coupled to a Y-axial driving mechanism 22 that is mounted on the supporting beam 17. The Y-axial driving mechanism 22 is realized by a known mechanism consisting of, for example, a Y-axial driving motor that rotates about a shaft set along the Y-axial direction, a ball screw that is coupled to the Y-axial driving motor, and a ball bearing that serves as a bearing for the ball screw. A Y-axial driving table is rotationally driven by a driving control exerted over the Y-axial driving mechanism 22 by the first control device 14 or the second control device 16, and the head carriage 21 is guided to move along the Y-axial direction by the Y-axial guide rails 18a and 18b. When the nozzles of the inkjet head 20 are positioned above the maintenance station 15 by the movement of the head carriage 21, the maintenance station 15 is moved up and down and it cleans the nozzles of the inkjet head 20.

A pair of X-axial guide rails 19a and 19b that are arranged in parallel along the Y-axial direction extend along the X-axial direction on the surface of the base 10 between the supporting legs 11 and 12. An X table 31 for mounting the medium holder 40 is mounted on the X-axial guide rails 19a and 19b in such a way as to be movable along the X-axial direction.

The X table 31 is a table that moves the medium holder 40 relative to the inkjet head 20 along the X-axial direction. The X table 31 is coupled to an X-axial driving mechanism 23 mounted on the base 10. The X-axial driving mechanism 23 is realized by a known mechanism consisting of, for example, an X-axial driving motor that rotates about a shaft set along the X-axial direction, a ball screw that is coupled to the X-axial driving motor, and a ball bearing that serves as a bearing for the ball screw. An X-axial driving table is rotationally driven by the driving control exerted over the X-axial driving mechanism 23 by the first control device 14 or the second control device 16, and the X table 31 is guided to move along the X-axial direction by the X-axial guide rails 19a and 19b. A Z-axial supporting mechanism 32 that extends along the Z-axial direction stands on the X table 31.

The Z-axial supporting mechanism 32 is a supporting member that supports the medium holder 40 in such a way as to be movable up and down along the Z-axial direction. To enable this, the Z-axial supporting mechanism 32 includes a pair of side walls 33a and 33b that stand in the Z-axial direction and a roof plate 34 that joins top portions of the side walls 33a and 33b. A hoisting mechanism 35 that moves up and down the medium holder 40 along the side walls 33a and 33b in the Z-axial direction is mounted between the side walls 33a and 33b.

The hoisting mechanism 35 includes a Z-axial driving motor 37 that is fixed to the X table 31 disposed between the side walls 33a and 33b, a ball screw 38 that stands in the Z-axial direction and is coupled to an output shaft of the Z-axial driving motor 37, and a ball bearing 39 that serves as a bearing for the ball screw 38 and that is coupled to the medium holder 40. The ball screw 38 is rotated by the driving control exerted over the Z-axial driving motor 37 by the first control device 14 or the second control device 16. The ball bearing 39, and thereby the medium holder 40, is moved up and down along the Z-axial direction by the rotation of the ball screw 38.

The medium holder 40 rotatably holds the medium M. To enable this, the medium holder 40 includes a Z table 41 that is mounted on the ball bearing 39 of the hoisting mechanism 35, a pair of arms 42a and 42b that jut out from the Z table 41 in the X-axial direction, an A-axial rotating mechanism 43 that is rotatably mounted on the arms 42a and 42b, and a chuck 44 that holds the medium M and that is rotatably mounted on the A-axial rotating mechanism 43.

The arms 42a and 42b are arranged opposing in the Y-axial direction and they swingably hold the A-axial rotating mechanism 43. In other words, a rotating shaft that extends along the Y-axial direction is mounted on ends of the arms 42a and 42b that are opposing, and the A-axial rotating mechanism 43 is mounted on the rotating shaft. An output shaft of an A-axial driving motor 45 to which the arm 42a is fixed is coupled to the rotating shaft. The A-axial driving motor 45 performs rotational driving in an A-axial direction, which is a rotational direction about the rotating shaft mounted on the arms 42a and 42b. Thus, the A-axial rotating mechanism 43 is swung in the A-axial direction by the rotational driving performed by the A-axial driving motor 45.

The A-axial rotating mechanism 43 rotatably holds the chuck 44. In other words, a B-axial driving motor 46 is mounted on the A-axial rotating mechanism 43, and performs rotational driving in a B-axial direction, which is a rotational direction about a rotating shaft that is perpendicular relative to the rotating shaft of the A-axial rotating mechanism 43. The chuck 44 that holds the medium M is mounted on an output shaft of the B-axial driving motor 46. Thus, the chuck 44 is rotated in the B-axial direction by the rotational driving performed by the B-axial driving motor 46.

Thus, the medium M that is held by the chuck 44 of the medium holder 40 is moved up and down in the Z-axial direction as well as rotated in the A-axial direction and the B-axial direction by the rotational driving performed by the Z-axial driving motor 37, the A-axial driving motor 45, and the B-axial driving motor 46.

A pair of Z-axial guide rails 36a and 36b that are arranged in parallel along the Y-axial direction stand in the Z-axial direction on the backside of the Z-axial supporting mechanism 32 in the X-axial direction. A plumb bob 50 of a predetermined weight is mounted on the Z-axial guide rails 36a and 36b in such a way as to be movable up and down.

The plumb bob 50 is cubical and is provided for counter-balancing a weight of the medium holder 40. A pair of pulleys 51a and 51b is rotatably supported above the Z-axial supporting mechanism 32. A wire 52 is looped over each of the pulleys 51a and 51b.

The wire 52 is made of metal and can be a single wire or a braiding of a plurality of wires, and has a high rigidity against a tensile load. The wires 52 are passed through a pair of hooks provided on the plumb bob 50 and their ends are fixed to the Z table 41 of the medium holder 40 by screws, etc. Thus, the medium holder 40 and the plumb bob 50 are suspended on the Z-axial supporting mechanism 32 by the wires 52. The plumb bob 50 has the same weight as that of the medium holder 40 or the total weight of the medium holder 40 and the medium M held by the medium holder 40 to counter-balance the weight of the medium holder 40 via the wires 52 that loop over the pulleys 51a and 51b. When the weight of the medium M is not known or when the media being used are of different weights, the plumb bob 50 that has a weight greater than that of the medium holder 40 by a predetermined value is preferably used.

In the 3D inkjet printer 1, the inkjet head 20 and the medium M are moved relative to each other in a 3D space by the driving control exerted by the first control device 14 or the second control device 16 over the X-axial driving mechanism 23, the Y-axial driving mechanism 22, the Z-axial driving motor 37, the A-axial driving motor 45, and the B-axial driving motor 46.

In other words, the inkjet head 20 is moved horizontally along the Y-axial direction relative to the medium M by the control exerted over the Y-axial driving mechanism 22. The medium M is moved horizontally along the X-axial direction relative to the inkjet head 20 by the driving control exerted over the X-axial driving mechanism 23. The medium M is moved up and down along the Z-axial direction relative to the inkjet head 20 by the driving control exerted over the Z-axial driving motor 37. The medium M is swung (rotated) in the A-axial direction relative to the inkjet head 20 by the driving control exerted over the A-axial driving motor 45. The medium M is rotated in the B-axial direction relative to the inkjet head 20 by the driving control exerted over the B-axial driving motor 46. Furthermore, at the time of printing an image on the medium M, control is exerted over the discharge of the ink from the inkjet head 20 while exerting control over each of the shafts such that a distance between the inkjet head 20 and a printing position of the medium M match up with a direction of a surface of the printing position of the medium M relative to the inkjet head 20. A high quality image can be printed on the surface of the medium M of a three-dimensional shape with this configuration.

Thus, in the 3D inkjet printer 1 according to an embodiment of the present invention, the inkjet head 20 is moved along the Y-axial direction relative to the medium M by the Y-axial driving mechanism 22, the medium M is moved along the X-axial direction relative to the inkjet head 20 by the X-axial driving mechanism 23, the medium M is moved along the Z-axial direction relative to the inkjet head 20 by the Z-axial driving motor 37, the medium M is swung in the A-axial direction relative to the inkjet head 20 by the A-axial driving motor 45, and the medium M is rotated in the B-axial direction relative to the inkjet head 20 by the B-axial driving motor 46. Thus, the inkjet head 20 and the medium M are made to move relative to each other by exertion of control over the five shafts, namely a Y shaft, an X shaft, a Z shaft, an A shaft, and a B shaft. Consequently, regardless of the printing position of the medium M, the distance between the inkjet head 20 and the medium M and the direction of the surface of the medium M relative to the inkjet head 20 can be made uniform. As a result, the quality of the printed image can be enhanced.

Furthermore, in the 3D inkjet printer 1, the A-axial rotating mechanism 43 that is swung in the A-axial direction is supported on the arms 42 that jut out from the Z-axial supporting mechanism 32 in the X-axial direction, and the chuck 44 that is rotated in the B-axial direction is held by the A-axial rotating mechanism 43. Consequently, the medium M can move in the 3D space without any interference with the Z-axial supporting mechanism 32.

Although some preferred embodiments of the invention are explained above, the present invention is not limited to the embodiments explained above. For example, in the embodiments explained above, each shaft is rotated by a ball screw mechanism. However, any mechanism that allows the inkjet head 20 and the medium M to move relative to each other in all the axial directions can be used.

The embodiment of the invention can be used as a 3D inkjet printer that prints on a surface of a medium of a three-dimensional shape by discharging ink thereon from an inkjet head.

In the 3D inkjet printer according to the embodiment of the present invention, the inkjet head and the medium are moved relative to each other in the Y-axial direction by the Y-axial driving mechanism, in the Z-axial direction by the Z-axial driving mechanism, in the X-axial direction by the X-axial driving mechanism, in the A-axial direction by the A-axial driving mechanism, and in the B-axial direction by the B-axial driving mechanism. Thus, the inkjet head and the medium can be moved relative to each other by exerting control along five axis, namely, a Y axis, an X shaft, a Z axis, an A axis, and a B axis. Consequently, regardless of a printing position of the medium, the distance between the inkjet head and the medium and a direction of a surface of the medium relative to the inkjet head can be made uniform. As a result, a quality of a printed image can be enhanced.

According to the embodiment of the present invention, it is preferable that the medium holder includes an arm mechanism that is supported by the Z-axial supporting mechanism and that juts out in the X-axial direction, an A-axial rotating mechanism that is supported by an end of the arm mechanism and that is swung in the A-axial direction by the A-axial driving mechanism, and a medium mounting mechanism that holds the medium, and that is mounted on the A-axial rotating mechanism, and rotated in the B-axial direction by the B-axial driving mechanism.

In the 3D inkjet printer according to the embodiment of the present invention, the A-axial rotating mechanism that is swung in the A-axial direction is supported on the arms that jut out from the Z-axial supporting mechanism in the X-axial direction, and the medium mount that is rotated in the B-axial direction is held by the A-axial rotating mechanism.

Consequently, the medium can move in a 3D space without any interference with the Z-axial supporting mechanism.

According to the embodiment of the present invention, a quality of a printed image is enhanced by making a positional relation between an inkjet head and a medium uniform.

Obviously, numerous modifications and variations of the present invention are possible in light of the above teachings. It is therefore to be understood that within the scope of the appended claims, the invention may be practiced otherwise than as specifically described herein.

What is claimed is:
1. A 3D inkjet printer comprising:
a medium holder configured to hold a medium having a three-dimensional shape with a surface to be printed;
an inkjet head configured to discharge ink to print on the surface of the medium while the medium holder and the inkjet head relatively move;
a Y-axial driving mechanism capable of moving the inkjet head along a Y-axial direction that is a main scanning direction;
a Z-axial supporting mechanism that supports the medium holder so as to be movable along a Z-axial direction that is a hoisting direction perpendicular to the Y-axial direction;
an X-axial driving mechanism capable of moving the Z-axial supporting mechanism along an X-axial direction perpendicular to the Y-axial direction and the Z-axial direction;
a Z-axial driving mechanism capable of moving the medium holder along the Z-axial direction;
the Z-axial supporting mechanism having a first side and a second side in the X-axial direction, the second side being a reverse side of the first side;
the medium holder being provided on the first side of the Z-axial supporting mechanism;
a plumb bob provided on the second side of the Z-axial supporting mechanism;
the medium holder and the plumb bob being connected by a wire and being suspended on the Z-axial supporting mechanism by the wire; and
the medium holder comprising:
an A-axial driving mechanism capable of swinging the medium along an A-axial direction that is a rotational direction about a shaft disposed along the Y-axial direction; and a B-axial driving mechanism capable of rotating the medium along a B-axial direction that is a rotational direction about a shaft disposed perpendicular to the Y-axial direction.

2. The 3D inkjet printer according to claim 1, wherein the medium holder further comprises an arm mechanism that is supported by the Z-axial supporting mechanism and that juts out in the X-axial direction, an A-axial rotating mechanism that is supported by an end of the arm mechanism and that is configured to swing in the A-axial direction by the A-axial driving mechanism, and a medium mounting mechanism that is configured to hold the medium and that is mounted on the A-axial rotating mechanism, the medium mounting mechanism being configured to rotate in the B-axial direction by the B-axial driving mechanism.

3. The 3D inkjet printer according to claim 1, further comprising:

a Z-axial guide rail standing in the Z-axial direction and provided on the second side of the Z-axial supporting mechanism in the X-axial direction, wherein the plumb bob is mounted on the Z-axial guide rail movably along the Z-axial direction.

4. The 3D inkjet printer according to claim 1, wherein a pulley is rotatably supported above the Z-axial supporting mechanism, and the wire is looped over the pulley.

5. The 3D inkjet printer according to claim 1, wherein the plumb bob has a same weight as a weight of the medium holder.

6. The 3D inkjet printer according to claim 1, wherein the plumb bob has a same weight as a total weight of the medium holder and the medium held by the medium holder.

7. The 3D inkjet printer according to claim 2, wherein the arm mechanism comprises a pair of arms which face to each other, a rotating shaft which extends along the Y-axial direction is mounted on each of ends of the pair of arms, and the A-axial rotating mechanism is mounted on the rotating shaft.

* * * * *